(12) United States Patent
Waffler

(10) Patent No.: US 9,455,638 B2
(45) Date of Patent: Sep. 27, 2016

(54) METHOD FOR OPERATING A RESONANT CONVERTER, AND RESONANT CONVERTER

(71) Applicant: Stefan Waffler, Buckenhof (DE)

(72) Inventor: Stefan Waffler, Buckenhof (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/624,121

(22) Filed: Feb. 17, 2015

(65) Prior Publication Data

US 2015/0236600 A1    Aug. 20, 2015

(30) Foreign Application Priority Data

Feb. 18, 2014 (DE) .................. 10 2014 202 954

(51) Int. Cl.
| | | |
|---|---|---|
| H02M 3/335 | (2006.01) | |
| H02M 7/48 | (2007.01) | |
| H02M 1/00 | (2006.01) | |
| H02M 1/42 | (2007.01) | |
| H01J 35/02 | (2006.01) | |
| H05G 1/10 | (2006.01) | |

(52) U.S. Cl.
CPC ........ H02M 3/33507 (2013.01); H01J 35/025 (2013.01); H02M 3/33515 (2013.01); H02M 3/33569 (2013.01); H05G 1/10 (2013.01); H02M 2001/0058 (2013.01); H02M 2001/0064 (2013.01); Y02B 70/1433 (2013.01); Y02B 70/1491 (2013.01)

(58) Field of Classification Search
CPC ............... H02M 3/33507; H02M 2001/0058; H02M 1/4241; H02M 2007/4815
USPC ............... 363/16, 21.02, 21.03, 21.09, 21.1, 363/56.01, 56.02, 95, 98, 131, 155, 156; 323/235
See application file for complete search history.

(56) References Cited

U.S. PATENT DOCUMENTS

| | | | | |
|---|---|---|---|---|
| 5,157,593 A | * | 10/1992 | Jain ....................... | H02M 3/337 363/132 |
| 2003/0205572 A1 | * | 11/2003 | Bassill ................... | H05B 6/062 219/661 |
| 2004/0125624 A1 | * | 7/2004 | Scheel ................. | H02M 7/5236 363/89 |
| 2008/0198634 A1 | * | 8/2008 | Scheel .................. | H02M 3/158 363/21.02 |
| 2008/0247194 A1 | * | 10/2008 | Ying .................... | H02M 3/3376 363/17 |
| 2012/0014138 A1 | * | 1/2012 | Ngo .................. | H02M 3/33584 363/17 |
| 2012/0170324 A1 | | 7/2012 | Fornage et al. | |
| 2013/0336013 A1 | * | 12/2013 | Mueller ............ | H02M 3/33569 363/17 |

FOREIGN PATENT DOCUMENTS

| | | |
|---|---|---|
| DE | 102009032980 A1 | 1/2011 |
| DE | 102011005446 A1 | 9/2012 |

OTHER PUBLICATIONS

German Office Action for German Application No. 10 2014 202 954.6, mailed Jul. 25, 2014, with English Translation.

* cited by examiner

*Primary Examiner* — Timothy J Dole
*Assistant Examiner* — Sisay G Tiku
(74) *Attorney, Agent, or Firm* — Lempia Summerfiled Katz LLC

(57) ABSTRACT

A method for operating a resonant converter having an inverter circuit, the inverter circuit having a plurality of switches, includes: switching each of the switches of the plurality of switches at an actuation frequency and with a phase angle offset relative to one another, such that a voltage of an output of the inverter circuit has a duty factor; and determining the actuation frequency and the duty factor for a prescribable operating point and with a prescribable phase reserve of the resonant converter. A resonant converter and an x-ray generator having a resonant converter are described.

18 Claims, 4 Drawing Sheets

METHOD FOR OPERATING A RESONANT CONVERTER, AND RESONANT CONVERTER

RELATED APPLICATIONS

This application claims the benefit of German Patent Application No. DE 102014202954.6, filed Feb. 18, 2014. The entire contents of the priority document are hereby incorporated herein by reference.

TECHNICAL FIELD

The present teachings relate generally to methods for operating soft-switching resonant converters having an inverter circuit and, in some embodiments, to soft-switching resonant converters having an inverter circuit.

BACKGROUND

The production of a high voltage for an x-ray tube may use inverter circuits operated at resonance. Such resonant converters are described, for example, in U.S. Patent Application Publication No. 2008/0198634 A1.

In a resonant inverter having a series resonant circuit that includes a series capacitor and a series inductor, and half-bridge actuation or full-bridge actuation, the output voltage and the output power may be set by varying the actuation frequency of the semiconductor switches in the bridge paths. If a transformer is used in the inverter for the purpose of DC-isolation or for setting up the voltage, the stray inductance of the transformer may perform the function of the series inductor, and only a series capacitor may be used. Depending on whether the actuation frequency is below or above the resonant frequency of the resonant circuit, a distinction may be drawn between sub-resonant and super-resonant actuation.

For sub-resonant actuation, the actuation frequency may be very low for low output powers, and may reach the audible frequency range. A multi-resonant inverter may be used to overcome this disadvantage (e.g., by connecting an inductor in parallel with the capacitor of the series resonant circuit). An output power of zero is achieved just for an actuation frequency close to the parallel resonant frequency, such that the frequency range of the actuation may be limited to a sufficiently narrow band. This approach may be used for the design of the output-side smoothing capacitors and the EMC filters.

However, in the case of sub-resonant actuation, the switching-on of a switch involves the reverse-connected diode in parallel with the opposite switch of the bridge path being commutated off. As a result, high switching losses (e.g., at relatively high switching frequencies) may occur. To reduce the switching losses, additional passive or active snubber networks may be used that allow zero-current switching. The current in the series resonant circuit is commutated from the switch to the diode with only small switching losses arising.

For super-resonant actuation, the voltage transformation and the power transmission close to the resonant frequency are at a maximum, and the actuation frequency may be greatly increased for relatively low powers. The resonant frequency may be chosen such that the actuation frequency is always above the audible range. Due to the parasitic capacitances and inductances of the transformer that cause additional points of resonance, it may be impossible to restrict the range of the actuation frequency, similar to sub-resonant actuation. The resonant circuit may be designed such that the resonant frequency is below the maximum output voltage for the minimum input voltage and the minimum actuation frequency desired for the maximum output power.

For example, when an additional range is to be covered for the input and output voltages, an inconvenient ratio for reactive and active power in the inverter away from this operating point may result. As a result, excessively high conductance losses are produced. For super-resonant operation, the reverse-connected parallel diodes may not be commutated off, but the current in the series resonant circuit may be actively disconnected by the switch, thereby producing switching losses. However, the switch-off losses may be minimized by capacitive switching load relief in the form of capacitors that are connected in parallel with the switches. At the moment of switching, zero-voltage switching is obtained.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in some embodiments, a method for operating a resonant converter, and a resonant converter having low switching losses even in the case of greatly varying input voltages, are provided.

In accordance with the present teachings, the actuation frequency and the duty factor of the inverter voltage in a resonant converter having an inverter are regulated simultaneously and in a coordinated manner. The duty factor and the actuation frequency are determined for each operating point of the resonant converter and a prescribed phase reserve. The operating point is determined from the input voltage, the output voltage, and the load at the output (e.g., from the output current). The phase reserve provides that the switches of the inverter are switched on at zero voltage.

A method for operating a resonant converter, the resonant converter having an inverter circuit, the inverter circuit having a plurality of switches, includes: switching the switches of the inverter at an actuation frequency and with a phase shift relative to one another, such that the inverter voltage at the output of the inverter has a prescribable duty factor; and ascertaining the actuation frequency and the duty factor for a prescribable operating point and a prescribable phase reserve of the resonant converter.

Through variation of the actuation frequency and phase shift modulation, with suitable dimensioning of the LCLC resonant circuit of a resonant converter, no-load switching may be achieved in a very wide operating range. At the same time, the reactive current in the inverter circuit and the frequency swing in the actuation frequency may be kept down. By way of example, the frequency swing for an input voltage range from 50% to 100% of the maximum input voltage, an output voltage range from 50% to 100% of the maximum output voltage and a load range from 1% to 100% of the rated output voltage may be limited to about a factor of two.

As a result of the wide operating range, the resonant converter may be operated at input voltages that vary widely. For example, these applications may include unregulated intermediate circuit voltages that dip under load due to the network internal impedance, and when the resonant converter is to be powered from networks having a different rated voltage.

In some embodiments, the phase reserve indicates the phase angle offset that exists between disconnection of the switches and the zero crossing of the resonant circuit current.

In some embodiments, the switches include a first switch, a second switch, a third switch, and a fourth switch. The first switch and the second switch form a first bridge path, and the third switch and the fourth switch form a second bridge path. The first switch, the second switch, the third switch, and the fourth switch are switched at the actuation frequency and with a phase offset.

In some embodiments, the phase reserve indicates the phase angle offset that exists either between disconnection of the first switch and the zero crossing of the resonant circuit current and between disconnection of the second switch and the zero crossing of the resonant circuit current or that exists between disconnection of the third switch and the zero crossing of the resonant circuit current and between disconnection of the fourth switch and the zero crossing of the resonant circuit current.

The actuation method for selecting the duty factor and actuation frequency facilitates zero-voltage no-load switching. The no-load switching is achieved without complicated snubber networks. Low switching losses result. Thus, either the resonant converter may be operated at high actuation frequencies or the complexity for cooling the power components falls.

In some embodiments, a latching time that indicates the period of time between switching of the first and second switches and between switching of the third and fourth switches is smaller than the phase reserve divided by $2\pi$ times the actuation frequency.

In some embodiments, an input voltage of the resonant converter, an output voltage of the resonant converter, and an output current of the resonant converter stipulate the operating point.

In some embodiments, the duty factor and the actuation frequency are determined from stored, previously ascertained tables based on the operating point.

In some embodiments, the phase reserve is complied with dynamically by a control unit based on limitation, pilot control and/or regulation of the actuation frequency and/or of the duty factor.

In some embodiments, the phase reserve may be complied with dynamically by observation of the resonant circuit current.

In some embodiments, a resonant converter having an inverter circuit is provided. The resonant converter is configured and programmed to carry out a method in accordance with the present teachings.

In some embodiments, the resonant converter may include a regulatory device that is configured and programmed to use previously ascertained and stored tables to ascertain the actuation frequency and the duty factor from the operating point and the phase reserve.

In some embodiments, an x-ray generator having a resonant converter in accordance with the present teachings is provided.

DETAILED DESCRIPTION

Figure 1:
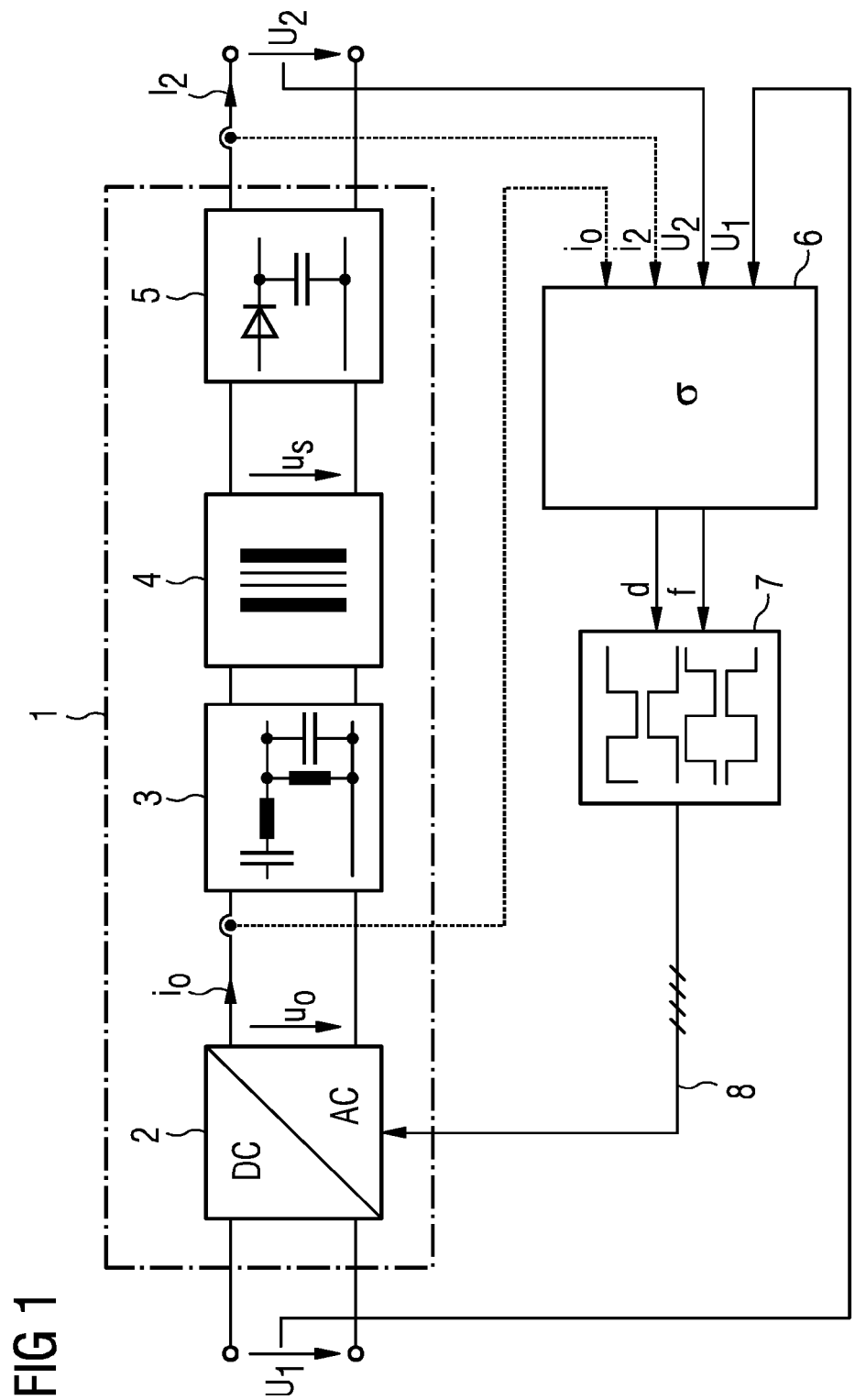
FIG. 1 shows a block diagram of an example of a resonant converter.

FIG. 1 shows a block diagram of a circuit arrangement for operation of a resonant converter in accordance with the present teachings. The resonant converter includes a power circuit portion 1 having an inverter circuit 2, a resonant circuit 3, a transformer circuit 4, and a rectifier circuit 5 with smoothing. The resonant converter further includes a regulatory device 6 that actuates a pulse generation circuit 7. The output of the pulse generation circuit 7 provides an actuation signal 8 that switches the switches of the inverter circuit.

The regulatory device 6 (e.g., a digital regulator) regulates the output voltage U2 and/or the output current I2 using the input voltage U1 by the two manipulated variables, actuation frequency f and duty factor d. The actuation frequency f and duty factor d are used by the pulse generation circuit 7 to produce the actuation signals 8 from the switches of the inverter circuit 2.

At the output of the inverter circuit 2, the resonant circuit current i0 and the resonant circuit voltage u0 are obtained. The output of the transformer circuit 4 provides the transformed resonant circuit voltage us. At the output of the rectifier circuit, the rectified and smoothed output voltage U2 and the output current I2 are obtained.

Figure 2:
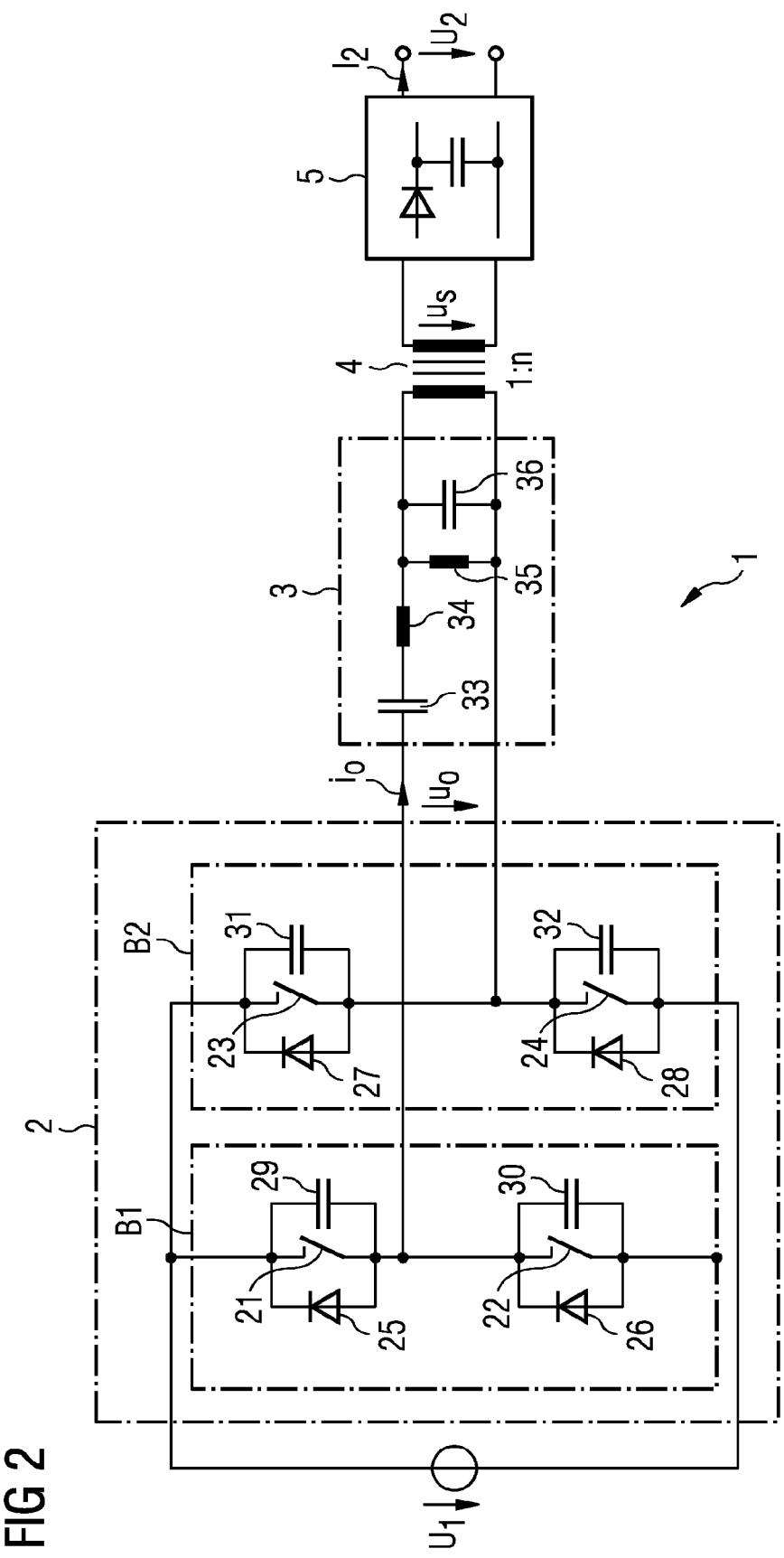
FIG. 2 shows a block diagram of an example of a power circuit portion of an exemplary resonant converter.

FIG. 2 shows a block diagram in more detail of the power circuit portion 1 of the resonant converter of FIG. 1. The power circuit portion 1 includes the inverter circuit 2. The inverter circuit 2 is in the form of a full bridge. The input side of the bridge is connected to the input voltage U1, and the output side of the bridge is connected to a resonant circuit 3. The resonant circuit 3 includes a series capacitor 33, a series inductor 34, a parallel inductor 35, and a parallel capacitor 36. The output side of the resonant circuit is connected to the transformer circuit 4.

The inverter circuit 2 includes a first bridge path B1 and a second bridge path B2. The first bridge path B1 and the second bridge path B2 are connected in parallel with the input voltage U1. The first bridge path B1 includes a first switch 21 and a second switch 22. The first switch 21 and the second switch 22 are arranged in series with a reverse-connected parallel first diode 25 and second diode 26, and a parallel first capacitor 29 and second capacitor 30.

The second bridge path B2 includes a third switch 23 and a fourth switch 24. The third switch 23 and the fourth switch 24 are arranged in series with a reverse-connected parallel third diode 27 and fourth diode 28, and a parallel third capacitor 31 and fourth capacitor 32.

The output of the inverter circuit 2 produces the resonant circuit current i0 and the resonant circuit voltage u0. The output of the transformer circuit 4 provides the transformed resonant circuit voltage us. At the output of the rectifier circuit 5, the rectified and smoothed output voltage U2 and the output current I2 are obtained.

The first switch 21, second switch 22, third switch 23, and fourth switch 24 of the full bridge are actuated as shown in FIG. 1 by the pulse generation unit 7 (not shown) based on the actuation parameters duty factor d and actuation frequency f. As a result of the duty factor d and actuation frequency f, the first switch 21 and second switch 22 of the first bridge path B1 are switched on alternately, and a latching time Tdt is complied with upon changeover. The third switch 23 and fourth switch 24 of the second bridge path B2 are likewise switched on alternately, and the latching time Tdt complied with upon changeover. The latching time Tdt provides that no shorts arise in the first bridge path B1 and second bridge path B2, and that the resonant circuit current i0 may reverse the charges of the output capacitances of the first switch 21, second switch 22, third switch 23, and fourth switch 24, and the additional first capacitor 29, second capacitor 30, third capacitor 31, and fourth capacitor 32 of the bridge path in question. As a result, the first switch 21, second switch 22, third switch 23, and fourth switch 24 in question may be switched on at zero voltage when the latching time Tdt has elapsed.

The actuation signals for the first bridge path B1 and second bridge path B2 have a phase shift through the angle Φ relative to one another. As a result, a resonant circuit voltage u0 with the duty factor d and the pulse frequency f occurs at the output of the inverter circuit 2.

One or more of the resonant circuit components 34 to 36 and the transformer circuit 4 may be parts of a real transformer. By way of example, the stray inductance of the real transformer takes on the function of the series inductance 34 (series inductor), the main inductance of the transformer takes on the function of the parallel inductance 35 (parallel inductor), and the winding capacitance of the secondary winding takes on the function of the parallel capacitor 36. The turn ratio between the secondary and primary windings determines the voltage transformation ratio n of the transformer circuit 4. Thus, the resonant converter includes only a few components and may be produced inexpensively.

The first capacitor 29, second capacitor 30, third capacitor 31, and fourth capacitor 32 used may also be output capacitances of the first switch 21, second switch 22, third switch 23, and fourth switch 24 if the first switch 21, second switch 22, third switch 23, and fourth switch 24 have a sufficiently high capacitance.

Since the first diode 25, second diode 26, third diode 27, and fourth diode 28 may not be commutated off, rapidly switching diodes with low storage charge may not be needed. The reverse-connected parallel first diode 25, second diode 26, third diode 27, and fourth diode 28 may also be parasitic diodes of the first switch 21, second switch 22, third switch 23, and fourth switch 24 (e.g., the parasitic body diode of a metal oxide semiconductor field effect transistor or MOSFET).

Figure 3:
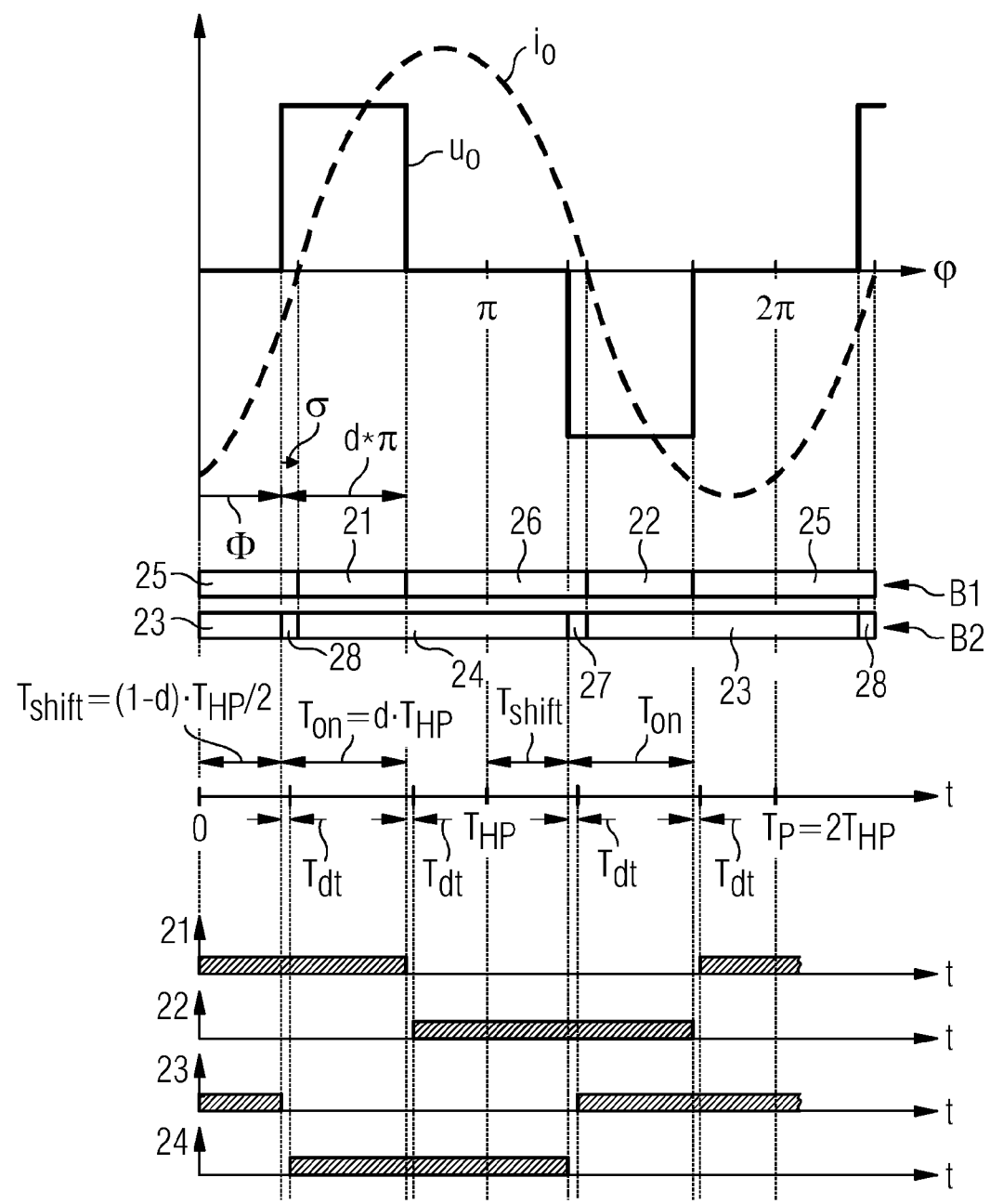
FIG. 3 shows a graph of an example of resonant circuit current as a function of phase, and a graph of an example of the time profile of the switches of the inverter.

FIG. 3 shows a graph that provides a more detailed illustration of the relationships described in FIG. 2. FIG. 3 shows, from top to bottom: the phase profile of the resonant circuit voltage u0 and of the resonant circuit current i0, the phase profile of the flow of current in the first bridge path B1 and the second bridge path B2, and the time profile of the switching states of the first switch 21, second switch 22, third switch 23, and fourth switch 24.

The actuation in accordance with the present teachings results in a resonant circuit current i0. The time of the zero crossing of the resonant circuit current i0 has a phase reserve σ greater than zero for the disconnection instants of the third switch 23 and the fourth switch 24. As a result, at the disconnection instant of the third switch 23 and the fourth switch 24, the resonant circuit current i0 flows through the relevant switch, and the third switch 23 and the fourth switch 24 may be switched off at zero voltage without capacitive load due to the third capacitor 31 and the fourth capacitor 32. At the switch-on instant of the third switch 23 and the fourth switch 24, the corresponding reverse-connected parallel third diode 27 and fourth diode 28 are conductive, and the third switch 23 and the fourth switch 24 may be switched on at zero voltage. In FIG. 3, the illustration beneath the curve profiles of the resonant circuit current i0 and the resonant voltage u0 shows what components of the first bridge path B1 and the second bridge path B2 are carrying current at present in each case.

In the case of a different phase shift Φ, the above description for the second bridge path B2 may apply mutatis mutandis to the components of the first bridge path B1.

The temporal illustration beneath the phase profiles shows the temporal relationships in detail. The time profile of the resonant circuit voltage u0 is determined by the period of time Tshift for the phase shift 0 and the period of time Ton wherein the resonant circuit voltage u0 is not equal to zero. The period of time Ton is equal to the product of the duty factor d and the period of time THP for one half-period of the period duration TP. The period duration TP is equal to the reciprocal of the actuation frequency f. The illustration in FIG. 3 also shows the latching time Tdt between the third switch 23 being switched off and the fourth switch 24 being switched on, and between the first switch 21 and the second switch 22. The times wherein the first switch 21, second switch 22, third switch 23, and fourth switch 24 are on and off may be seen at the bottom of the chart.

A method for determining the actuation parameters duty factor d and actuation frequency f of the inverter circuit 2 shown in FIGS. 1 and 2 is described below. The method results in curve profiles as shown in FIG. 3. Such a method provides that, at every operating point of a resonant converter defined by input voltage U1, output voltage U2, and load or output current I2, the phase reserve σ is complied with at the output.

For example, the actuation parameters duty factor d and actuation frequency f are determined by two analytical equations that describe the behavior of the resonant converter based on the duty factor d and actuation frequency f being resolved by specifying an operating point and a phase reserve σ. The actuation parameters duty factor d and actuation frequency f may be calculated in real time by the regulatory device 6, or may be ascertained beforehand for the desired operating range of the resonant converter for later use by the regulatory device 6 (e.g., in the form of tables).

Figure 4:
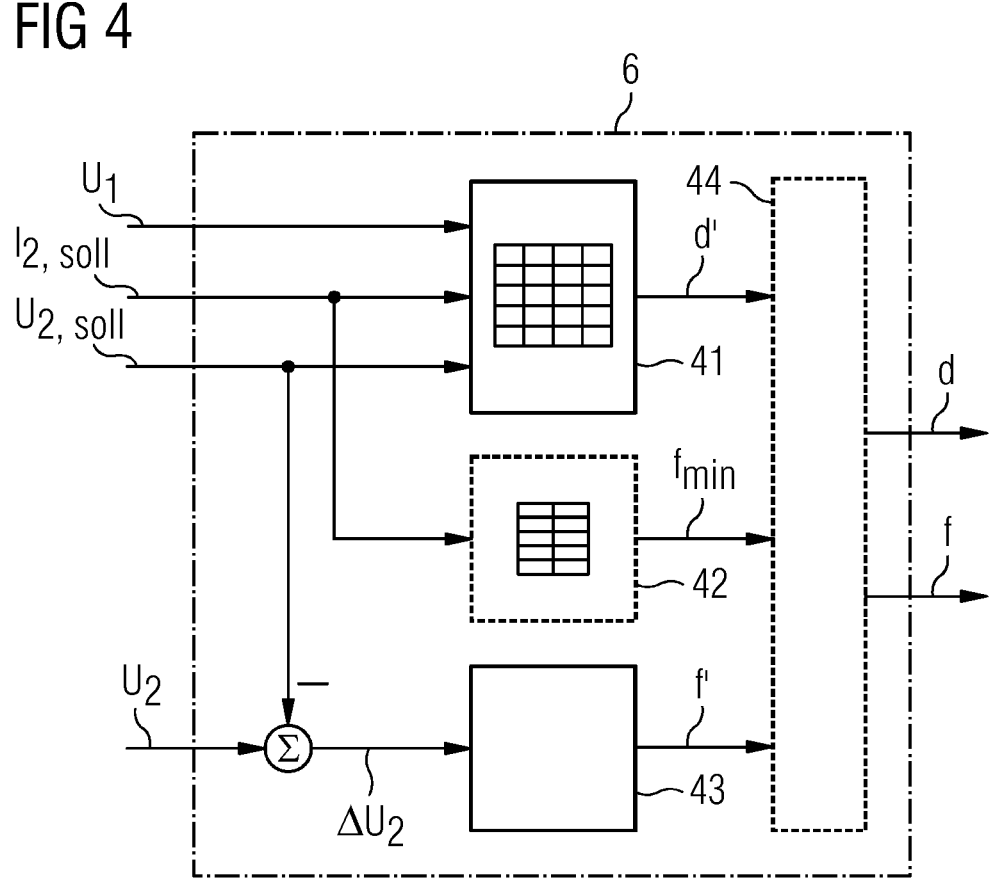
FIG. 4 shows a block diagram of an example of a regulatory device.

The regulatory device 6 may be implemented as shown in the block diagram in FIG. 4. The diagram in FIG. 4 provides for tabularization of the duty factor d based on operating point and regulation using the manipulated variable actuation frequency f. In a first tabularization unit 41, the duty factor d is ascertained from the input variables input voltage U1, setpoint value of the output current I2,setpoint, and setpoint value of the output voltage U2,setpoint.

In a second tabularization unit 42, the minimum actuation frequency fmin is ascertained from the setpoint value of the output current I2,setpoint. The regulatory unit 43 is used to ascertain on the output side the manipulated variable f' that corresponds to the actuation frequency f. The input of the regulatory unit 43 has the difference between the setpoint value of the output voltage U2,setpoint and the output voltage U2 applied to it (e.g., the voltage difference ΔU2).

An optional control unit 44 uses limitation, pilot control and/or regulation to provide that the phase reserve σ is complied with even for tolerances in the resonant circuit components or for dynamic state changes in the resonant converter. Optionally, compliance may also be accomplished by observation and advance calculation of the resonant circuit current i0.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A method for operating a resonant converter, the resonant converter comprising an inverter circuit, the inverter circuit comprising a plurality of switches, the method comprising:
switching each of the switches of the plurality of switches at an actuation frequency and with a phase shift relative to each other, such that a voltage at an output of the inverter circuit has a duty factor,
wherein the plurality of switches comprises a first switch, a second switch, a third switch, and a fourth switch, wherein the first switch and the second switch form a first bridge path, and wherein the third switch and the fourth switch form a second bridge path; and
determining the actuation frequency and the duty factor for an assignable operating point and with an assignable phase reserve of the resonant converter,
wherein a latching time is smaller than the phase reserve divided by $2\pi$ times the actuation frequency, wherein the latching time indicates a period of time between switching of the first switch and the second switch and between switching of the third switch and the fourth switch.

2. The method of claim 1, wherein the phase reserve indicates a phase angle offset between disconnection of the plurality of switches and a zero crossing of a resonant circuit current.

3. The method of claim 2, wherein
the method further comprises:
switching the first switch, the second switch, the third switch, and the fourth switch at the actuation frequency;
switching the first switch and the second switch in alternation;
switching the third switch and the fourth switch in alternation; and
switching the first switch and the second switch of the first bridge path and the third switch and the fourth switch of the second bridge path with a phase angle offset relative to one another, such that the output of the inverter circuit provides a voltage having the duty factor.

4. The method of claim 3, wherein the phase reserve indicates the phase angle offset that exists between either (a) disconnection of the first switch and a zero crossing of a resonant circuit current and between disconnection of the second switch and the zero crossing of the resonant circuit current, or (b) disconnection of the third switch and the zero crossing of the resonant circuit current and between disconnection of the fourth switch and the zero crossing of the resonant circuit current.

5. The method of claim 2, wherein an input voltage of the resonant converter, an output voltage of the resonant converter, and an output current of the resonant converter stipulate the operating point.

6. The method of claim 2, further comprising determining the duty factor and the actuation frequency from stored, previously determined tables based on the operating point.

7. The method of claim 1, wherein
the method further comprises:
switching the first switch, the second switch, the third switch, and the fourth switch at the actuation frequency;
switching the first switch and the second switch in alternation;
switching the third switch and the fourth switch in alternation; and
switching the first switch and the second switch of the first bridge path and the third switch and the fourth switch of the second bridge path with a phase angle offset relative to one another, such that the output of the inverter circuit provides a voltage having the duty factor.

8. The method of claim 7, wherein the phase reserve indicates the phase angle offset that exists between either (a) disconnection of the first switch and a zero crossing of a resonant circuit current and between disconnection of the second switch and the zero crossing of the resonant circuit current, or (b) disconnection of the third switch and the zero crossing of the resonant circuit current and between disconnection of the fourth switch and the zero crossing of the resonant circuit current.

9. The method of claim 8, wherein an input voltage of the resonant converter, an output voltage of the resonant converter, and an output current of the resonant converter stipulate the operating point.

10. The method of claim 8, wherein an input voltage of the resonant converter, an output voltage of the resonant converter, and an output current of the resonant converter stipulate the operating point.

11. The method of claim 7, wherein an input voltage of the resonant converter, an output voltage of the resonant converter, and an output current of the resonant converter stipulate the operating point.

12. The method of claim 1, wherein an input voltage of the resonant converter, an output voltage of the resonant converter, and an output current of the resonant converter stipulate the operating point.

13. The method of claim 1, further comprising determining the duty factor and the actuation frequency from stored, previously determined tables based on the operating point.

14. The method of claim 1, further comprising:
using a control unit to comply dynamically with the phase reserve based on limitation, pilot control, regulation of the actuation frequency, regulation of the duty factor, or combinations thereof.

15. The method of claim 1, wherein the phase reserve is complied with dynamically by observation of a resonant circuit current.

16. A resonant converter comprising an inverter circuit, the inverter circuit comprising a plurality of switches, wherein the resonant converter is configured to:
switch each of the switches of the plurality of switches of the inverter circuit at an actuation frequency and with a phase shift relative to each other, such that a voltage at an output of the inverter circuit has a duty factor, wherein the plurality of switches comprises a first switch, a second switch, a third switch, and a fourth switch, wherein the first switch and the second switch form a first bridge path, and wherein the third switch and the fourth switch form a second bridge path; and determine the actuation frequency and the duty factor for an assignable operating point and with an assignable phase reserve of the resonant converter, wherein a latching time is smaller than the phase reserve divided by $2\pi$ times the actuation frequency, wherein the latching time indicates a period of time between switching of the first switch and the second switch and between switching of the third switch and the fourth switch.

17. The resonant converter of claim 16, further comprising:

a regulatory device configured to use previously determined and stored tables to determine the actuation frequency and the duty factor from the operating point and the phase reserve.

18. An x-ray generator comprising a resonant converter, the resonant converter comprising an inverter circuit, the inverter circuit comprising a plurality of switches, wherein the resonant converter is configured to:

switch each of the switches of the plurality of switches of the inverter circuit at an actuation frequency and with a phase shift relative to each other, such that a voltage at an output of the inverter circuit has a duty factor, wherein the plurality of switches comprises a first switch, a second switch, a third switch, and a fourth switch, wherein the first switch and the second switch form a first bridge path, and wherein the third switch and the fourth switch form a second bridge path; and determine the actuation frequency and the duty factor for an assignable operating point and with an assignable phase reserve of the resonant converter, wherein a latching time is smaller than the phase reserve divided by $2\pi$ times the actuation frequency, wherein the latching time indicates a period of time between switching of the first switch and the second switch and between switching of the third switch and the fourth switch.

* * * * *